Aug. 21, 1928.
N. PENSABENE
DYNAMO ELECTRIC MACHINE
Filed Dec. 27, 1927
1,681,780
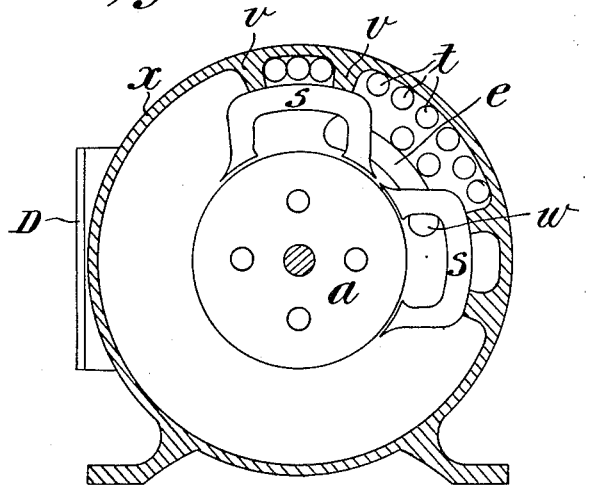
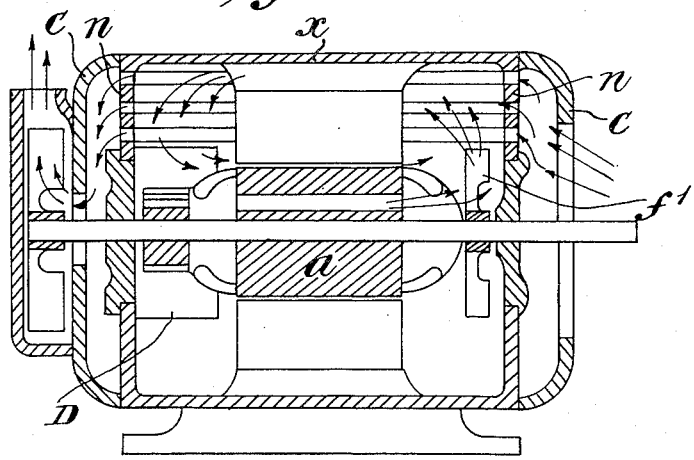
Inventor
Nicolo Pensabene Patented Aug. 21, 1928.

1,681,780

UNITED STATES PATENT OFFICE.

NICOLO PENSABENE, OF LONDON, ENGLAND.

DYNAMO-ELECTRIC MACHINE.

Application filed December 27, 1927, Serial No. 242,860, and in Great Britain November 25, 1926.

This invention relates to the construction of direct or continuous current motors and dynamos of the totally enclosed type and has for its object to provide means whereby for a given weight and temperature rise an output can be obtained larger than has been possible up to now.

Various methods have been suggested for cooling totally enclosed machines, these consisting merely in providing cooling pipes through the machine carrying cool air induced by a fan.

In an ordinary construction, however, where the casing or yoke is made of magnetic material forming part of the magnetic circuit, the position of the pipes is not compatible with compactness of design, there being no room available inside the machine, especially when commutating poles are used, unless an otherwise unnecessary larger diameter with consequent larger weight of yoke and poles is adopted.

In my present invention I make use of the split pole type of machine in which the supporting frame does not form part of the magnetic circuit and can be made of small steel section or of non-magnetic light weight material as, for instance, aluminum.

A machine of this type having a short magnetic circuit has already the advantage of being light in weight and when used totally enclosed lends itself to a system of cooling which only implies a very small addition to the weight.

In particular, this type of construction with split poles and one exciting coil per pole is most suitable because in this type there are large empty spaces between the field coil and the frame which are very suitable for carrying cooling pipes.

The type of construction referred to above is described in prior British specification No. 189,862.

In the accompanying drawing it will be seen that for a 4-pole construction the magnetic system consists of four sections bolted to a frame having no magnetic function, each section representing two half-pole faces and tips, two half-pole bodies and a connecting yoke.

Between two adjacent sections and the frame there are triangular-shaped empty spaces which would allow cooling tubes, which, passing through all the length of the machine, are securely fixed between two flanges of the case so as to prevent the cool air passing through them to be in contact with the inside air of the machine.

The hot air inside the machine is kept in contact with these tubes by means of an inside fan or fans while an outside fan draws cool air through the tubes.

If desired, the outside case can be made larger in diameter than is necessary for supporting the field system, this entailing only a small extra weight in the case which is already a small fraction of the total weight of the machine.

In order to make the invention understood and only by way of example, Figure 1 and Figure 2 are given representing the transverse and longitudinal sections of a 4-pole totally enclosed machine.

The case $x$ is shown to have projecting ribs $v$ on its inside surface in order to support the four magnetic sections $s$. It is seen that two adjacent half sections form a magnetic pole split in the centre. The field coils $w$ in this case are as many as the magnetic poles.

Between two sections $s$ the case and the sides $e$ of the field coils the cooling tubes $t$ are shown. Other tubes can be placed between the ribs $v$ referred to above.

These tubes, which are made of good conducting and radiating material, are fixed between the flanges $n$ of the case, as shown in Figure 2. The armature with winding and commutator is shown in Figures 1 and 2 and is marked $a$.

Inside the case a fan $f^1$ drives the hot air through the armature and commutating poles and throws it outward so as to impinge on the cooling tubes.

The cool air through these tubes is shown to be driven from the driving end of the machine and deflected by the covers $C$ so as to cool the end brackets of the machine.

It can be seen that the cooling surface of these tubes of small diameter can be as great as several times the outside surface of the machine.

These tubes can be a thin material coated with suitable heat-conducting paint and any suitable shape to increase their radiating surface. The tubes can be enclosed in a case through which the current of hot air to be cooled will be circulated.

In a split pole machine having a number of field coils equal to double the number of poles the supporting case can be made still larger in diameter and the cooling pipes placed in the inside periphery of the case.

This type of construction lends itself to a scheme of ventilation employing a fan placed at the commutator end, the inspection doors D being provided in the body of the case, as shown in the drawing.

I claim:—

A dynamo electric machine having an enclosing casing with inwardly extending spaced ribs on its inner wall, a shaft and armature positioned centrally of said casing, a split pole field element comprising a plurality of separate magnetic paths supported by said ribs between said casing and armature, a plurality of cooling tubes extending lengthwise of said casing between said ribs, said armature having passages formed lengthwise thereof, means for causing flow of air through said first mentioned tubes for external cooling, and a separate means for circulating air about said tubes and through the passages in the armature in a closed internal cooling circuit.

In testimony whereof I have affixed my signature hereto this 6th day of December, 1927.

NICOLO PENSABENE.